Jan. 6, 1931.  F. C. OSBORNE  1,787,757
ATTACHMENT FOR AUTOMOBILES
Filed May 5, 1927   3 Sheets-Sheet 2
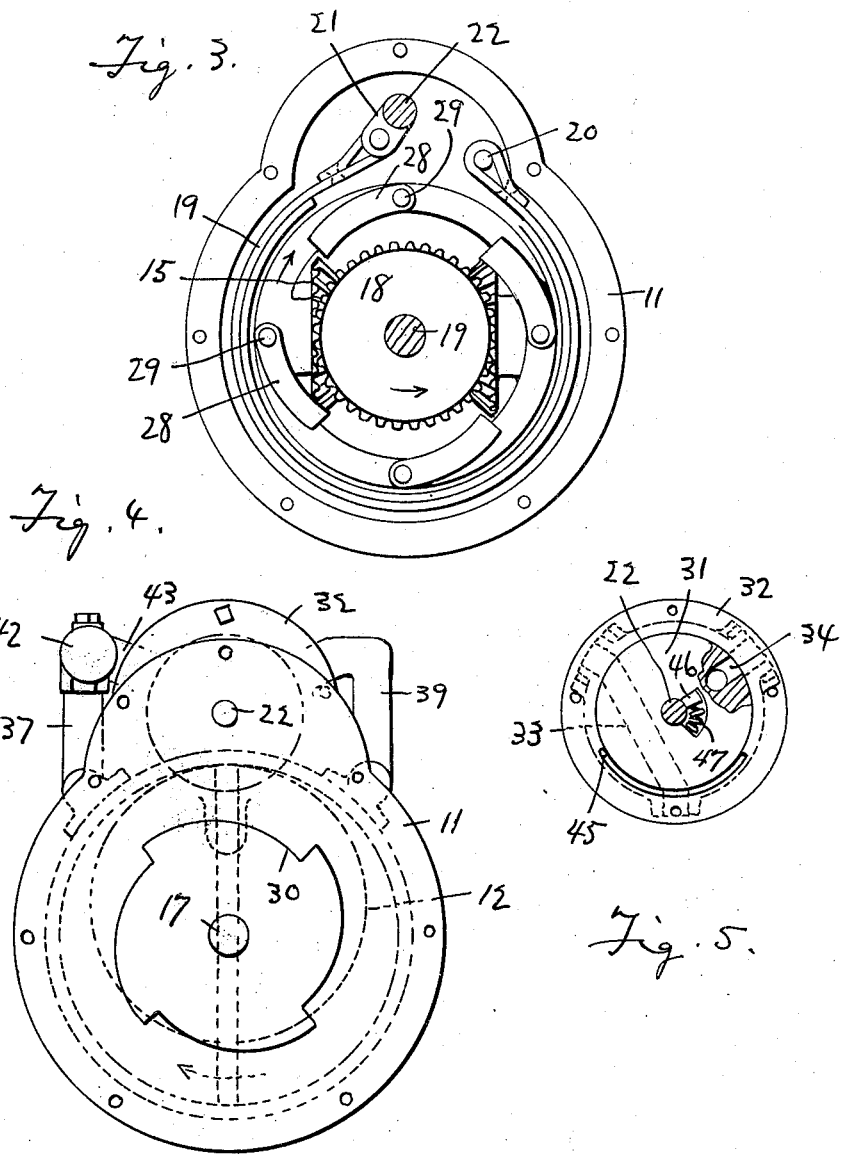
Inventor
Frank C. Osborne
By Clarence A. O'Brien
Attorney

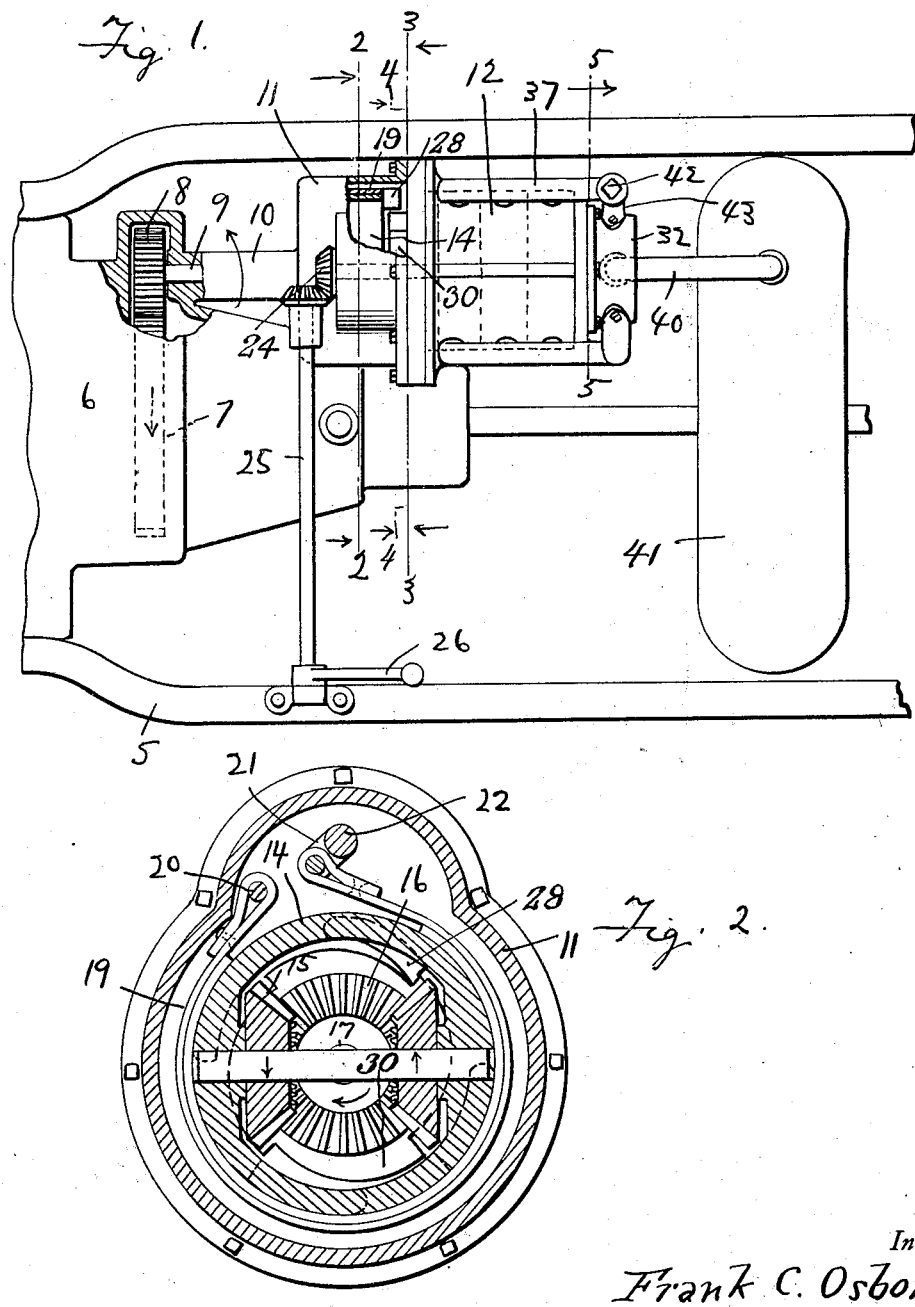

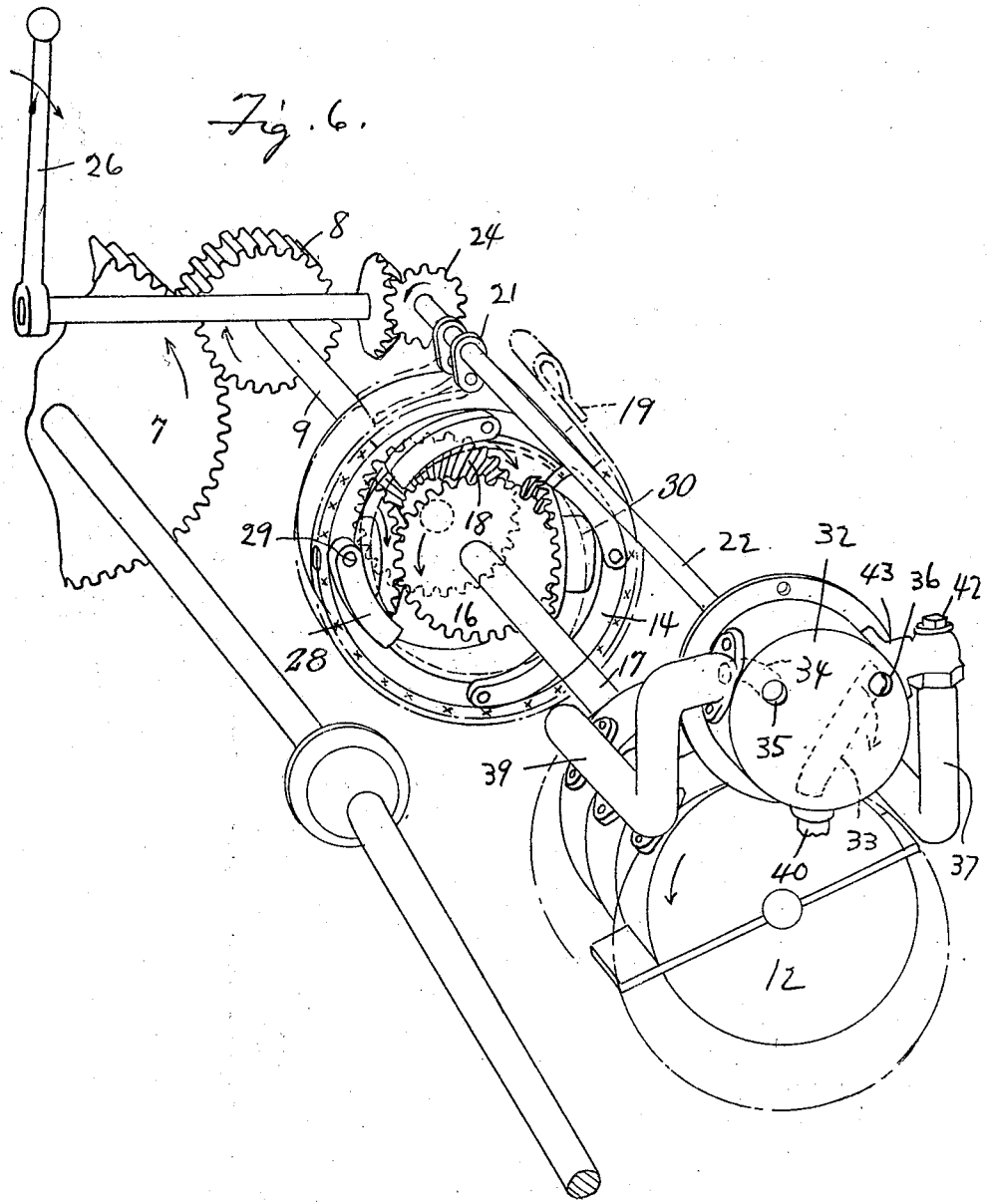

Patented Jan. 6, 1931

1,787,757

UNITED STATES PATENT OFFICE

FRANK CROMWELL OSBORNE, OF ST. PETERSBURG, FLORIDA

ATTACHMENT FOR AUTOMOBILES

Application filed May 5, 1927. Serial No. 189,013.

The present invention relates to an attachment for an automobile and has for its principal object to provide a structure whereby energy may be stored up when the automobile is descending a hill or is being brought to a stop, said energy to be used in starting the automobile in order that a quick getaway may be realized in traffice or under other conditions.

A still further important object of the invention lies in the provision of an apparatus of this nature which is capable of storing up air under pressure and is capable of using the air thus stored up for running the apparatus to be used for moving the vehicle or the like.

A still further very important object of the invention lies in the provision of an apparatus of this nature which is simple in its construction, comparatively inexpensive to manufacture, strong and durable, compact and convenient, thoroughly efficient and reliable in operation, not likely to easily become out of order, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:

Figure 1 is a plan view showing a portion of an automobile chassis with my improved attachment mounted in place.

Figure 2 is a sectional view taken substantially on the line 2—2 of Figure 1,

Figure 3 is a sectional view taken substantially on the line 3—3 of Figure 1,

Figure 4 is a sectional view taken substantially on the line 4—4 of Figure 1,

Figure 5 is a view taken substantially on the line 5—5 of Figure 1,

Figure 6 is a perspective view showing the improved attachment.

Referring to the drawing in detail, it will be seen that the numeral 5 denotes an automobile or other vehicle chassis having mounted thereon an engine 6 including a flywheel 7. The flywheel 7 is formed with peripheral teeth meshing with gear 8 on a shaft 9 journaled in a shaft housing 10 leading to a differential housing 11. The numeral 12 denotes a rotary pump structure of any desired or preferred construction connected with the differential housing 11. The differential in the housing 11 comprises a drum 14 having spider gears 15 mounted therein and meshing with a gear 16 on pump shaft 17 and a gear 18 on the shaft 9. The numeral 19 denotes a brake band anchored at one end as at 20 in the housing 11 and extending around the drum 14 and engaged with the crank 21 of a shaft 22 which is operable through gearing 24, a shaft 25 and a lever 26, said lever 26 being conveniently located to be controlled by the driver of the automobile. The drum 14 has a plurality of pawls 28 pivotally mounted thereon as at 29 and adapted to swing outwardly by gravity for engaging ratchet teeth 30 formed in the casing 11 to prevent the rotation of the drum 14 in one direction. A rotary valve 31 is mounted on the shaft 22 to be operated thereby. This valve 31 is mounted in a valve casing 32 at one end of the pump structure 12 and has a passage 33 extending therethrough and another passage 34 extending therethrough. The passage 33 extends as a chord from one portion of the periphery to another portion thereof while the passage 34 extends from a portion of the periphery through one side to register with either opening 35 or 36 in the casing 32. The numeral 37 denotes an outlet pipe for the pump and the numeral 39 an inlet pipe therefor. The pipe 40 leads from the valve casing 32 to a storage tank 41.

A check valve 42 is provided in the pipe 37 and has a branch 43 leading to the casing 32.

Referring now to the parts as shown in Figure 6 and supposing that the vehicle is going down hill faster than desired or is coming to a stop, the operator throws the lever 26 in the direction of the arrow so as to frictionally apply the brake band 19 to the drum 14 thus preventing rotation of said drum 14 and simultaneously placing the valve 31 in the position shown in Figure 6. In this connection it is to be noted that the valve is limited in its rotation by a pin and slot arrangement as at 45 and it is also to be noted that the shaft 22 operates the valve through a lug 46 engaging a spring 47 so that the brake band may be tightly engaged with the drum after the valve has reached the position shown in Figure 6 that is with the passage 33 extending from the connection 43 to the pipe 40. The flywheel 7 is rotating in the direction of the arrow thereon in Figure 6 thereby driving the gear 8 in an opposite direction to turn the shaft 9 which turns the gear 18 causing the spider gears 15 to rotate thereby rotating the gear 16 and the pump shaft 17 in a counterclockwise direction in this figure and this will cause air to be sucked through the opening 35, through the pipe 39, into the pump and forced out through pipe 37, through check valve 42, through connection 43, through passage 33, through pipe 40 to be stored in the tank 41.

Supposing now that the automobile has come to a stop and it is desired to obtain a quick getaway. It will be seen that the lever 26 may be thrown in the opposite direction to the arrow thereon so as to release the brake band and rotate the valve position wherein the passage 33 connects pipe 39 with pipe 40 and the passage 34 connects opening 36 with the connection 43 and thus compressed air will flow through pipe 40, passage 33, pipe 39, through the pump to rotate the shaft 17, said air escaping through pipe 37, check valve 42, connection 43, passage 34 and opening 36. The rotation of the shaft 17, of course, rotates the gear 16 which rotates the spider gears 15 because the drum 14 cannot rotate in this direction because of the pawls 28 and the ratchet teeth 30 and thus rotary motion is imparted to gear 18, shaft 9 and the gear 8 in the same direction to the arrow shown thereon in Figure 6 for driving the flywheel 7 of the engine. Thus with this additional energy the automobile may get away quicker than with the power of the engine alone.

It is thought that the construction, operation, and advantages of this invention will be clearly understood without a more detailed description thereof. The present embodiment of the invention has been disclosed in detail merely by way of example since in actual practice it attains the features of advantage enumerated as desirable in the statement of the invention, and the above description. It is apparent that changes in the details of construction, and in the combination and arrangement of parts may be resorted to without departing from the spirit or scope of the invention as hereinafter claimed or sacrificing any of its advantages.

Having thus described my invention, what I claim as new is:—

In combination, a differential mechanism comprising a housing, a drum rotatable in the housing, spider gears mounted in the drum, a pair of gears meshing with the spider gears, shafts leading from each of the said pair of gears, a brake band disposed about the drum, pawls pivotally mounted on the drum, said housing having ratchet teeth with which the pawls will engage if the drums are rotated in one direction, an air pump on one of the shafts, an air storage tank, a valve, and means associated with the valve, whereby air may be stored by the operation of the pump into the tank, or air may be taken from the tank to drive the pump, and means for simultaneously operating the valve and the brake band.

In testimony whereof I affix my signature.

FRANK CROMWELL OSBORNE.